(12) United States Patent
Li et al.

(10) Patent No.: US 11,566,091 B2
(45) Date of Patent: Jan. 31, 2023

(54) ETHYLENE VINYL ALCOHOL COPOLYMER RESIN COMPOSITION, ETHYLENE VINYL ALCOHOL COPOLYMER FILM FORMED THEREFROM, AND MULTILAYER STRUCTURE CONTAINING THE SAME

(71) Applicant: CHANG CHUN PETROCHEMICAL CO., LTD., Taipei (TW)

(72) Inventors: Yu Hsiu Li, Taipei (TW); Hou Hsi Wu, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/700,999

(22) Filed: Mar. 22, 2022

(65) Prior Publication Data
US 2022/0403078 A1 Dec. 22, 2022

(30) Foreign Application Priority Data

Jun. 16, 2021 (CN) .......................... 202110668496.X
Jun. 16, 2021 (TW) ................................. 110121913

(51) Int. Cl.
| | |
|---|---|
| *C08F 216/06* | (2006.01) |
| *B32B 7/12* | (2006.01) |
| *B32B 27/08* | (2006.01) |
| *B32B 27/30* | (2006.01) |
| *B32B 27/32* | (2006.01) |
| *C08J 5/18* | (2006.01) |

(52) U.S. Cl.
CPC .............. *C08F 216/06* (2013.01); *B32B 7/12* (2013.01); *B32B 27/08* (2013.01); *B32B 27/306* (2013.01); *B32B 27/32* (2013.01); *C08J 5/18* (2013.01); *B32B 2250/246* (2013.01); *B32B 2307/538* (2013.01); *B32B 2307/72* (2013.01); *C08J 2329/04* (2013.01)

(58) Field of Classification Search
CPC ...... C08F 16/06; C08F 116/06; C08F 216/06; C08L 29/04; B32B 27/306
See application file for complete search history.

(56) References Cited

U.S. PATENT DOCUMENTS

| | | | |
|---|---|---|---|
| 5,972,447 | A | 10/1999 | Hata et al. |
| 10,808,110 | B2 | 10/2020 | Kometani et al. |

(Continued)

FOREIGN PATENT DOCUMENTS

| | | | |
|---|---|---|---|
| JP | H-11291244 | A | 10/1999 |
| JP | H-11294947 | A | 10/1999 |

(Continued)

*Primary Examiner* — Zachary M Davis
(74) *Attorney, Agent, or Firm* — Muncy, Geissler, Olds & Lowe, P.C.

(57) ABSTRACT

The present invention relates to an ethylene-vinyl alcohol copolymer (EVOH) resin composition, an EVOH film formed therefrom, and a multilayer structure containing the same. The core height difference (Sk) of the surface of the EVOH resin composition is between 0.6 and 2.0 µm, and the overall standard deviation of Sk is between 0.05 and 0.55. The invention can reduce the torque output during processing to achieve the effect of energy saving, and can also improve the stability during output to obtain a better film appearance.

14 Claims, 2 Drawing Sheets

(56) References Cited

U.S. PATENT DOCUMENTS

| | | | |
|---|---|---|---|
| 10,961,378 B1 | 3/2021 | Lin et al. | |
| 2003/0060550 A1* | 3/2003 | Inomata | C08K 3/38 524/394 |

FOREIGN PATENT DOCUMENTS

| | | | |
|---|---|---|---|
| JP | 2000128996 A | 5/2000 | |
| JP | 2000264972 A | 9/2000 | |
| JP | 2014098169 A | 5/2014 | |
| KR | 19980025133 A | 7/1998 | |
| TW | 202102552 A | 1/2021 | |
| WO | WO-2018/003884 A1 | 1/2018 | |

* cited by examiner

ETHYLENE VINYL ALCOHOL COPOLYMER RESIN COMPOSITION, ETHYLENE VINYL ALCOHOL COPOLYMER FILM FORMED THEREFROM, AND MULTILAYER STRUCTURE CONTAINING THE SAME

BACKGROUND OF THE INVENTION

1. Technical Field

The present invention relates to an ethylene-vinyl alcohol copolymer (EVOH) resin composition. The EVOH resin composition has a specific range of surface roughness, especially the core height difference (Sk) of its surface is between 0.6 and 2.0 μm, and the overall standard deviation of Sk is between 0.05 and 0.55. The present invention also discloses a film formed from the EVOH resin composition and a multilayer structure containing the EVOH resin composition.

2. Description of Related Art

EVOH resins are widely used in laminates for preserving perishable items. For example, EVOH resins and laminates are commonly used by the food packaging industry, medical device and supplies industry, pharmaceutical industry, electronics industry, and agrochemical industry. EVOH resins are often incorporated as a distinct layer within a laminate to serve as an oxygen-barrier layer.

In the past, EVOH pellets often accumulated on the screw or blocked during the extrusion process during processing, resulting in an increase in the torque value of the screw, and these problems may reduce the visual appearance and mechanical strength of the film formed from EVOH. In addition, these problems cannot be adequately dealt with or solved by conventional techniques.

BRIEF SUMMARY OF THE INVENTION

In view of the continuous demand for reducing the torque output during processing and improving the appearance of the EVOH resin film.

The present invention relates to an ethylene-vinyl alcohol copolymer (EVOH) resin composition having a specific range of surface roughness, wherein the ethylene-vinyl alcohol copolymer resin composition includes an ethylene-vinyl alcohol copolymer resin, for example, the core height difference (Sk) of its surface is between 0.6 and 2.0 μm, and the overall standard deviation of Sk is between 0.05 and 0.55. In a preferred embodiment, the core height difference (Sk) of the surface of the EVOH resin composition is between 0.6 and 2.0 μm, and the overall standard deviation of Sk is between 0.10 and 0.45. The EVOH resin composition may be in the form of particles, films, fibers and the like. The EVOH resin composition can be used to prepare films or multilayer structures. The inventor found that by controlling the surface roughness parameter Sk of the EVOH resin composition within a specific range, the torque value of the screw output during the processing of EVOH pellets can be reduced, so as to achieve the effect of energy saving, realize the cost-effective EVOH resin composition process, and improve the stability during output to obtain a better film appearance.

In another aspect of the present invention, an EVOH resin composition (or pellets thereof) having a slip agent of 50-200 ppm is provided. For example, the core height difference (Sk) of the surface of the EVOH resin composition of the invention is 0.6-2.0 μm, and the overall standard deviation of Sk is 0.05-0.55, and it has a slip agent of 50-200 ppm. In some cases, the EVOH resin composition may have a boron content of 10-450 ppm. For example, the core height difference (Sk) of the surface of the EVOH resin composition of the invention is 0.6-2.0 μm, and the overall standard deviation of Sk is 0.05-0.55, and it has a boron content of 10-450 ppm.

Additionally or alternatively, the ethylene-vinyl alcohol copolymer resin in the EVOH resin composition may have a saponification degree of 99.5 mole % or higher. The ethylene-vinyl alcohol copolymer resin in the EVOH resin composition may have an ethylene content of about 20 to about 48 mole %. For example, the ethylene content of the ethylene-vinyl alcohol copolymer may be about 25 to about 45 mole %. The EVOH resin composition may be formed of two or more EVOHs having different ethylene contents.

In a non-limiting example, the EVOH resin composition has a bulk density of 73-76 g/cm$^3$. In some cases, the EVOH resin composition has an angle of repose of 12.0°-21.0°.

In a non-limiting example, the moisture content of the ethylene-vinyl alcohol copolymer resin composition is less than 1.1 wt %.

The EVOH resin composition may be in the form of particles, films, fibers and the like. In some embodiments, the EVOH resin composition is in the form of particles, and the weight of 100 particles is between 1.4 and 2.3 g.

According to at least one embodiment, the multilayer structure includes: (a) at least one layer formed of the aforementioned EVOH resin; (b) at least one polymer layer; and (c) at least one adhesive layer. The polymer layer can be selected from the group consisting of low-density polyethylene layer, polyethylene grafted maleic anhydride layer, polypropylene layer and nylon layer, for example. The adhesive layer is a tie layer.

BRIEF DESCRIPTION OF THE FIGURE

Implementation of the present technology will now be described, by way of example only, with reference to the attached figures, wherein.

Figure 1:
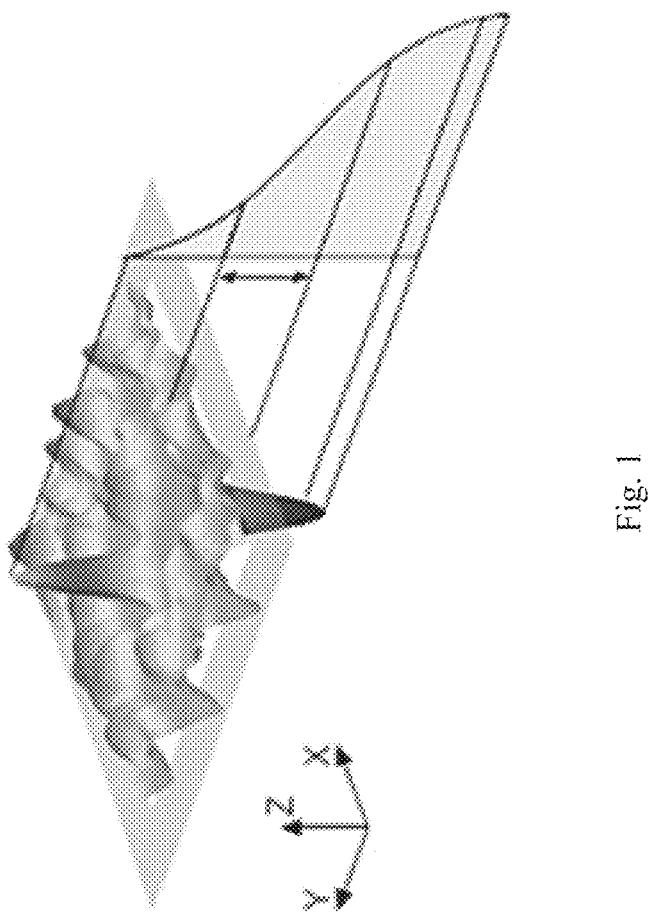
FIG. 1 is a three-dimensional illustration of the core height difference applied according to the present invention.

It should be understood that the various aspects of the present invention are not limited to the configurations, means, and characteristics shown in the drawings.

DETAILED DESCRIPTION OF THE INVENTION

The present invention relates to an ethylene-vinyl alcohol copolymer (EVOH) resin composition. The EVOH resin composition has a specific range of surface roughness, especially the core height difference (Sk) of the surface is between 0.6 and 2.0 μm, and the overall standard deviation of Sk is between 0.05 and 0.55. For the control of the surface roughness Sk of the EVOH resin composition, the EVOH resin composition and its film can have good effects by controlling different slip agent addition methods and addition amounts in the EVOH process. The EVOH resin composition can be used to prepare films or multilayer structures. The inventor found that by controlling the surface roughness parameter Sk of the EVOH resin composition in a specific range, the torque value of the screw output during the processing of EVOH pellets can be reduced so as to achieve the effect of energy saving, and it can also improve the stability during output and obtain a better film appearance.

Figure 2:
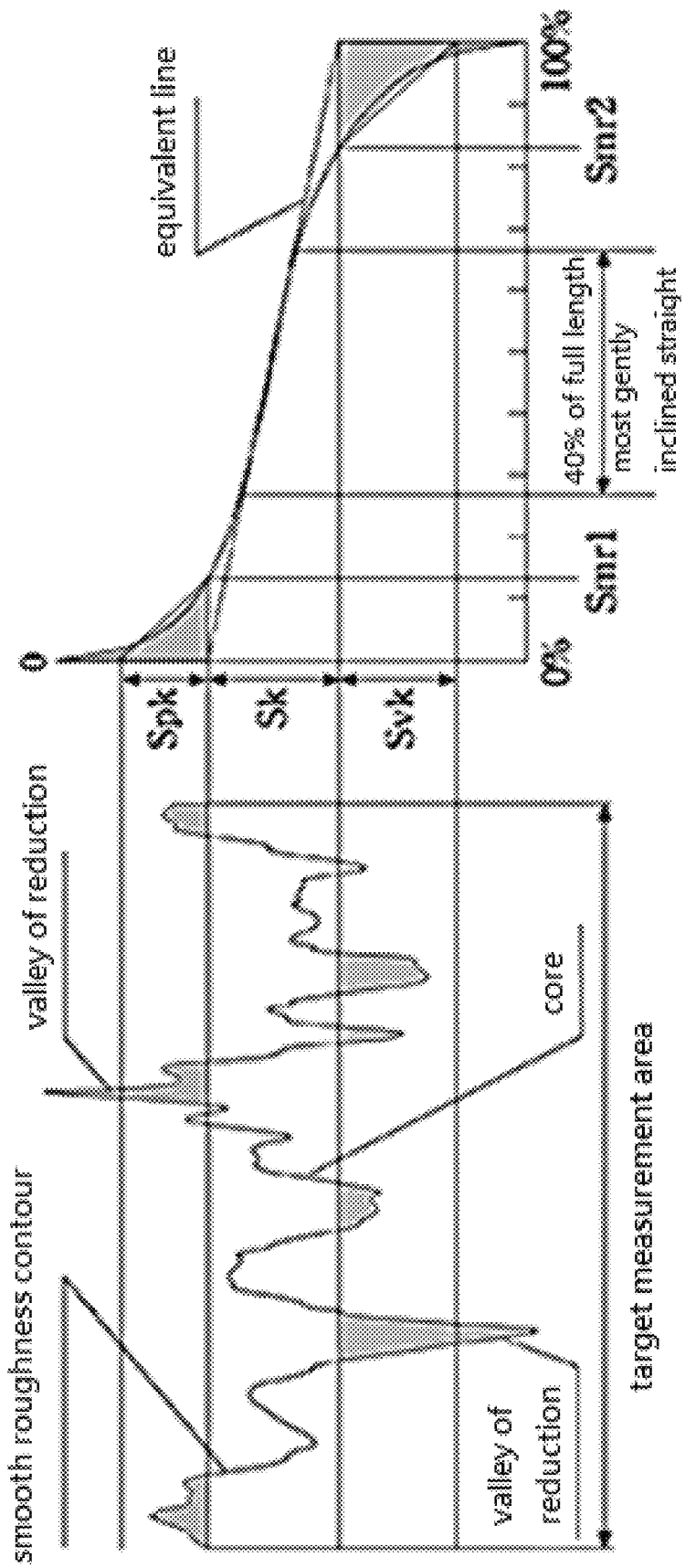
FIG. 2 is a two-dimensional illustration of the core height difference applied according to the present invention.

The core height difference (Sk) is a parameter that can be used to comprehensively evaluate the surface roughness state. Sk is the value of the maximum height minus the minimum height of the core, calculated from the height difference between the equivalent linear load area ratio of 0% and 100%. As shown in FIGS. 1 and 2, Sk represents the height of the core, i.e., the distance between the upper and lower levels of the core surface; Smr1 represents the load area ratio (expressed as a percentage) that distinguishes the core from the protruding crest; Smr2 represents the load area ratio (expressed as a percentage) that distinguishes the core from the protruding trough; Spk represents the peak height removed, i.e., the average height of the peak higher than the core surface; and Svk represents the depth of the valley removed, i.e., the average height of the valley below the core surface. This parameter expands the load length ratio curve parameter of the profile parameter to three dimensions. The Sk can be, for example, 0.6-2.0 μm, 0.6-1.9 μm, 0.6-1.8 μm, 0.6-1.7 μm, 0.6-1.6 μm, 0.6-1.5 μm, 0.6-1.4 μm, 0.6-1.3 μm, 0.6-1.2 μm, 0.6-1.1 μm, 0.6-1.0 μm, 0.6-0.9 μm, 0.8-2.0 μm, 0.8-1.9 μm, 0.8-1.8 μm, 0.8-1.7 μm, 0.8-1.6 μm, 0.8-1.5 μm, 0.8-1.4 μm, 0.8-1.3 μm, 0.8-1.2 μm, 0.8-1.1 μm, 0.8-1.0 μm, 1.0-2.0 μm, 1.0-1.9 μm, 1.0-1.8 μm, 1.0-1.7 μm, 1.0-1.6 μm, 1.0-1.5 μm, 1.0-1.4 μm, 1.0-1.3 μm, 1.0-1.2 μm, 1.2-2.0 μm, 1.2-1.9 μm, 1.2-1.8 μm, 1.2-1.7 μm, 1.2-1.6 μm, 1.2-1.5 μm, 1.2-1.4 μm, 1.4-2.0 μm, 1.4-1.9 μm, 1.4-1.8 μm, 1.4-1.7 μm, 1.4-1.6 μm, 1.6-2.0 μm, 1.6-1.9 μm, or 1.6-1.8 μm. In some cases, the overall standard deviation of Sk may be, for example, 0.05-0.55, 0.05-0.50, 0.05-0.45, 0.05-0.40, 0.05-0.35, 0.05-0.30, 0.05-0.25, 0.05-0.20, 0.05-0.15, 0.10-0.55, 0.10-0.50, 0.10-0.45, 0.10-0.40, 0.10-0.35, 0.10-0.30, 0.10-0.25, 0.10-0.20, 0.20-0.55, 0.20-0.50, 0.20-0.45, 0.20-0.40, 0.20-0.35, 0.20-0.30, 0.30-0.55, 0.30-0.50, 0.30-0.45, 0.30-0.40, 0.40-0.55 or 0.40-0.50. In some embodiments, the core height difference (Sk) of the surface of the EVOH resin composition is between 0.6 and 2.0 μm, and the overall standard deviation of Sk is between 0.05 and 0.55. In a preferred embodiment, the core height difference (Sk) of the surface of the EVOH resin composition is between 0.6 and 2.0 μm, and the overall standard deviation of Sk is between 0.10 and 0.45. If the Sk value is too high, it is easy to cause friction when the particles are transported in the screw, which causes the torque value of the screw to increase during the output process. If the Sk value is too low, it means that the core height difference of the surface of the EVOH resin composition is small; as a result, the EVOH resin composition is prone to uneven heating due to the small contact area when heat is conducted in the screw, and the final film thickness uniformity is reduced. When the overall standard deviation of Sk is high, it means that the surface properties are not uniform, which easily affects the stability of the screw output, and also tends to produce uneven film thickness.

In one aspect, the present invention provides an EVOH resin composition. The EVOH resin composition may be in the form of pellet(s), film(s), fiber(s) and the like. The EVOH pellets mentioned herein refer to the form and/or shape of one or more pellets of the EVOH resin composition after pelletization. Although the EVOH resin composition that is pelletized to form one or more EVOH pellets is described throughout the present invention, the EVOH resin composition can also be processed into the form of beads, cubes, chips, shavings, and the like. In some embodiments, the EVOH resin composition is in the pellet form. The so-called pellet form can be columnar, spherical or flat, wherein the columnar shape can be cylindrical, elliptical columnar, angular columnar, and the spherical shape can be round, elliptical or chess-shaped. In other embodiments, the EVOH resin composition is in the form of pellet, and the weight of 100 pellets is between 1.4 and 2.3 g. The weight of 100 pellets can be, for example, 1.4-2.3 g, 1.4-2.2 g, 1.4-2.1 g, 1.4-2.0 g, 1.4-1.9 g, 1.4-1.8 g, 1.4-1.7 g, 1.5-2.3 g, 1.5-2.2 g, 1.5-2.1 g, 1.5-2.0 g, 1.5-1.9 g, 1.5-1.8 g, 1.5-1.7 g, 1.6-2.3 g, 1.6-2.2 g, 1.6-2.1 g, 1.6-2.0 g, 1.6-1.9 g, 1.6-1.8 g, 1.6-1.7 g, 1.7-2.3 g, 1.7-2.2 g, 1.7-2.1 g, 1.7-2.0 g, 1.7-1.9 g, 1.7-1.8 g, 1.8-2.3 g, 1.8-2.2 g, 1.8-2.1 g, 1.8-2.0 g or 1.8-1.9 g.

The EVOH pellets are formed of an EVOH, and the EVOH has an ethylene content. For example, the ethylene content of the EVOH may be about 20 to about 48 mole %, about 20 to about 45 mole %, about 25 to about 45 mole %, about 28 to about 42 mole %, or about 30 to about 40 mole %. The EVOH resin composition may be formed of two or more EVOHs having different ethylene contents. For example, the ethylene content of one of the EVOHs may be in the range of about 20 to about 35 mole %, for example, about 24 to about 35 mole %, about 28 to about 35 mole %, about 20 to about 32 mole %, about 24 to about 32 mole %, about 28 to about 32 mole %, about 20 to about 30 mole %, or about 24 to about 30 mole %. Additionally or alternatively, the ethylene content of one of the EVOHs may be in the range of about 36 to about 48 mole %, for example, about 40 to about 48 mole %, about 44 to about 48 mole %, about 36 to about 45 mole %, or about 40 to about 45 mole %. However, in some preferred embodiments, the EVOH resin composition is formed from a single EVOH with an ethylene content of about 20 to about 48 mole %.

Additionally or alternatively, the EVOH in the EVOH resin composition 100 may have a saponification degree of 90 mole % or more, preferably 95 mole % or more, preferably 97 mole % or more, preferably 99.5% mole % or more.

The EVOH resin composition may contain a boron compound and/or boric acid and/or cinnamic acid and/or alkali metals and/or conjugated polyenes and/or slip agents and/or alkaline earth metals in some cases. The above-mentioned materials can impart better properties to the EVOH resin composition.

Additionally or alternatively, according to other aspects of the present invention, the EVOH resin composition may have a boron content of 10 to 450 ppm. For example, the core height difference (Sk) of the surface of the EVOH resin composition of the present invention is between 0.6 and 2.0 μm, the overall standard deviation of Sk is between 0.05 and 0.55, and the boron content is between 10 and 450 ppm. Without being limited to any specific theory, it is believed that adding a boron compound to the EVOH resin composition and making the boron content of the EVOH composition be 10 to 450 ppm reduces or eliminates the adhesion of the EVOH resin composition during the extrusion process of the screw extruder, and further improves the thickness uniformity and flexibility of the film. In some cases, such an EVOH resin composition can clean the screw extruder by removing or at least partially removing the EVOH resin previously adhered to the inner surface of the screw extruder during the extrusion process.

A typical EVOH resin composition may include an ethylene-vinyl alcohol copolymer and a boron compound, wherein the boron content of the EVOH resin composition is 10 to 450 ppm. In some cases, the boron content of the EVOH resin composition based on the total weight of the EVOH resin composition may be 10 to 450 ppm, 10 to about 400 ppm, 10 to about 350 ppm, 10 to about 300 ppm, 10 to about 275 ppm, 10 to about 250 ppm, 10 to about 225 ppm, 10 to about 200 ppm, 10 to about 175 ppm, 10 to 450 ppm, about 20 to about 400 ppm, about 20 to about 350 ppm, about 20 to about 300 ppm, about 20 to about 275 ppm, about 20 to about 250 ppm, about 20 to about 225 ppm, about 20 to about 200 ppm, about 20 to about 175 ppm, about 60 to 450 ppm, about 60 to about 400 ppm, about 60 to about 350 ppm, about 60 to about 300 ppm, about 60 to about 275 ppm, about 60 to about 250 ppm, about 60 to about 225 ppm, about 60 to about 200 ppm, about 60 to about 175 ppm, about 100 to 450 ppm, about 100 to about 400 ppm, about 100 to about 350 ppm, about 100 to about 300 ppm, about 100 to about 275 ppm, about 100 to about 250 ppm, about 100 to about 225 ppm, about 100 to about 200 ppm, about 100 to about 175 ppm, about 140 to 450 ppm, about 140 to about 400 ppm, about 140 to about 350 ppm, about 140 to about 300 ppm, about 140 to about 275 ppm, about 140 to about 250 ppm, about 140 to about 225 ppm, about 140 to about 200 ppm, about 180 to about 450 ppm, about 180 to about 400 ppm, about 180 to about 350 ppm, about 180 to about 300 ppm, about 180 to about 275 ppm, about 180 to about 250 ppm, about 180 to about 225 ppm, about 220 to 450 ppm, about 220 to about 400 ppm, about 220 to about 350 ppm, about 220 to about 300 ppm, or about 220 to about 275 ppm. When the boron content of the EVOH resin composition is within a certain range, the viscosity of the EVOH resin composition can be increased and the chance of the EVOH resin composition sticking to the screw can be reduced, or the EVOH on the screw can be removed, so that the material has a self-cleaning function and further improves the uniformity of the film thickness. In some cases, in addition to the boron content of 10 to 450 ppm, the EVOH resin composition may further include cinnamic acid, alkali metals, conjugated polyenes, alkaline earth metals, salts thereof, and/or mixtures thereof. The above-mentioned substances are common substances usually present in the EVOH resin composition, giving it better properties. If the content of the conjugated polyene in the EVOH resin composition per unit weight is 1 to 30000 ppm, the coloration after heating can be further suppressed and the thermal stability can be improved. If the content of the alkali metal or alkaline earth metal in the EVOH resin composition per unit weight is 1 to 1000 ppm in terms of metal, the long-term operation formability can be improved.

The boron compound may, in some instances, include boric acid or a metal salt thereof. Examples of the metal salt include, but are not limited to, calcium borate, cobalt borate, zinc borate (e.g., zinc tetraborate or zinc metaborate), potassium aluminum borate, ammonium borate (e.g., ammonium metaborate, ammonium tetraborate, ammonium pentaborate, or ammonium octaborate), cadmium borate (e.g., cadmium orthoborate or cadmium tetraborate), potassium borate (e.g., potassium metaborate, potassium tetraborate, potassium pentaborate, potassium hexaborate, or potassium octaborate), silver borate (e.g., silver metaborate or silver tetraborate), copper borate (e.g., copper (II) borate, copper metaborate, or copper tetraborate), sodium borate (e.g., sodium metaborate, sodium diborate, sodium tetraborate, sodium pentaborate, sodium hexaborate, or sodium octaborate), lead borate (e.g., lead metaborate or lead hexaborate), nickel borate (e.g., nickel orthoborate, nickel diborate, nickel tetraborate, or nickel octaborate), barium borate (e.g., barium orthoborate, barium metaborate, barium diborate, or barium tetraborate), bismuth borate, magnesium borate (e.g., magnesium orthoborate, magnesium diborate, magnesium metaborate, trimagnesium tetraborate, or pentamagnesium tetraborate), manganese borate (e.g., manganese (I) borate, manganese metaborate, or manganese tetraborate), lithium borate (e.g., lithium metaborate, lithium tetraborate, or lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

The EVOH resin composition may further include a slip agent. If the slip agent content per unit weight of the EVOH resin composition is 1-300 ppm, the processability can be more excellent. In some embodiments, the EVOH resin composition (or pellets thereof) has a slip agent amount of 50-200 ppm, such as 50-200 ppm, 50-180 ppm, 50-160 ppm, 50-140 ppm, 50-120 ppm, 50-100 ppm, 50-90 ppm, 50-80 ppm, 50-70 ppm, 60-200 ppm, 60-180 ppm, 60-160 ppm, 60-140 ppm, 60-120 ppm, 60-100 ppm, 60-90 ppm, 60-80 ppm, 60-70 ppm, 70-200 ppm, 70-180 ppm, 70-160 ppm, 70-140 ppm, 70-120 ppm, 70-100 ppm, 70-90 ppm, 70-80 ppm, 90-200 ppm, 90-180 ppm, 90-160 ppm, 90-140 ppm, 90-120 ppm, 90-100 ppm, 100-200 ppm, 100-180 ppm, 100-160 ppm, 100-140 ppm, 100-120 ppm, 110-200 ppm, 110-180 ppm, 110-160 ppm, 110-140 ppm, 130-200 ppm, 130-180 ppm, 130-160 ppm, 150-200 ppm, 150-180 ppm, 150-160 ppm, 170-200 ppm or 170-180 ppm. For example, the core height difference (Sk) of the surface of the EVOH resin composition of the present invention is between 0.6 and 2.0 μm, the overall standard deviation of Sk is between 0.05 and 0.55, and the amount of slip agent is between 50 and 200 ppm. In some cases, the slip agent is, for example, saturated fatty acid amide (e.g., behenic acid amide, or stearyl amide), unsaturated fatty acid amide (e.g., oleamide, or erucic acid amide), butyl stearate, stearyl alcohol, stearic acid monoglyceride, calcium stearate, zinc stearate, ethylene distearylamide, sorbitan monopalmitate, sorbitan monostearate, mannitol, stearic acid, hardened castor oil, or N,N-ethylene bis-stearamide. The slip agent may be used singly, or two or more of them may be used in combination.

In a non-limiting example, the EVOH resin composition has a bulk density ranging from 73 to 76 g/cm$^3$, such as 73-76 g/cm$^3$, 73-75.8 g/cm$^3$, 73-75.6 g/cm$^3$, 73-75.4 g/cm$^3$, 73-75.2 g/cm$^3$, 73-75 g/cm$^3$, 73-74.8 g/cm$^3$, 73-74.6 g/cm$^3$, 73-74.4 g/cm$^3$, 73-74.2 g/cm$^3$, 73-74 g/cm$^3$, 73.5-76 g/cm$^3$, 73.5-75.8 g/cm$^3$, 73.5-75.6 g/cm$^3$, 73.5-75.4 g/cm$^3$, 73.5-75.2 g/cm$^3$, 73.5-75 g/cm$^3$, 73.5-74.8 g/cm$^3$, 73.5-74.6 g/cm$^3$, 73.5-74.4 g/cm$^3$, 73.5-74.2 g/cm$^3$, 73.5-74 g/cm$^3$, 74-76 g/cm$^3$, 74-75.8 g/cm$^3$, 74-75.6 g/cm$^3$, 74-75.4 g/cm$^3$, 74-75.2 g/cm$^3$, 74-75 g/cm$^3$, 74-74.8 g/cm$^3$, 74-74.6 g/cm$^3$, 74.5-76 g/cm$^3$, 74.5-75.8 g/cm$^3$, 74.5-75.6 g/cm$^3$, 74.5-75.4 g/cm$^3$, 74.5-75.2 g/cm$^3$, 74.5-75 g/cm$^3$, 75-76 g/cm$^3$, 75-75.8 g/cm$^3$, or 75-75.6 g/cm$^3$.

In some cases, the EVOH resin composition has an angle of repose of 12.0°-21.0°, such as 12.0°-21.0°, 12.0°-20.5°, 12.0°-20.0°, 12.0°-19.5°, 12.0°-19.0°, 12.0°-18.5°, 12.0°-18.0°, 12.0°-17.5°, 12.0°-17.0°, 12.0°-16.5°, 12.0°-16.0°, 12.0°-15.5°, 12.0°-15.0°, 12.0°-14.5°, 12.0°-14.0°, 12.0°-13.5°, 12.0°-13.0°, 13.0°-21.0°, 13.0°-20.5°, 13.0°-20.0°, 13.0°-19.5°, 13.0°-19.0°, 13.0°-18.5°, 13.0°-18.0°, 13.0°-17.5°, 13.0°-17.0°, 13.0°-16.5°, 13.0°-16.0°, 13.0°-15.5°, 13.0°-15.0°, 13.0°-14.5°, 13.0°-14.0°, 14.0°-21.0°, 14.0°-20.5°, 14.0°-20.0°, 14.0°-19.5°, 14.0°-19.0°, 14.0°-18.5°, 14.0°-18.0°, 14.0°-17.5°, 14.0°-17.0°, 14.0°-16.5°, 14.0°-16.0°, 14.0°-15.5°, 14.0°-15.0°, 15.0°-21.0°, 15.0°-20.5°, 15.0°-20.0°, 15.0°-19.5°, 15.0°-19.0°, 15.0°-18.5°, 15.0°-

18.0°, 15.0°-17.5°, 15.0°-17.0°, 15.0°-16.5°, 15.0°-16.0°, 16.0°-21.0°, 16.0°-20.5°, 16.0°-20.0°, 16.0°-19.5°, 16.0°-19.0°, 16.0°-18.5°, 16.0°-18.0°, 16.0°-17.5°, 16.0°-17.0°, 17.0°-21.0°, 17.0°-20.5°, 17.0°-20.0°, 17.0°-19.5°, 17.0°-19.0°, 17.0°-18.5°, or 17.0°-18.0°.

The EVOH resin composition of the present invention usually has a specific range of moisture content. For example, the moisture content of the EVOH resin composition is evaluated by volatile content. The moisture content of the EVOH resin composition can be less than 1.1 wt %, less than 1.02%, less than 1.0%, less than 0.9%, less than 0.8%, less than 0.7%, less than 0.6%, less than 0.5%, less than 0.4%, less than 0.3%, less than 0.2%, less than 0.1%, between 0.01 and 1.1 wt %, between 0.08 and 1.1 wt %, or between 0.05 and 1.1 wt %. It was unexpectedly discovered that the moisture content of the EVOH resin composition must be controlled within a certain range, otherwise excessively high moisture content will cause bubbles, uneven film thickness and increased flow marks in the film or multilayer structure formed by the EVOH resin composition, causing problems in subsequent processing. Volatile content: The final EVOH pellets prepared were analyzed using the method of ISO 14663-2 Annex A.

When the EVOH resin composition is cylindrical or elliptical cylindrical pellet, the height can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm; and the long axis of its cross-sectional area can be 1.5-5.0 mm, 1.7-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 1.7-4.5 mm, 1.7-4.4 mm, 1.7-4.2 mm, 1.7-4.0 mm, 1.7-3.8 mm, 1.7-3.6 mm, 1.7-3.4 mm, 1.7-3.2 mm, or 1.7-3.0 mm.

When the EVOH resin composition is the pellet in the form of round particle shape, the round particle shape can be round shape, elliptical shape, or Go-shape, where the maximum outer diameter of the pellet is taken as the long side, and the maximum diameter in the cross section with the largest area in the cross section perpendicular to the long side is taken as the short side. The long side can be 1.5-5.0 mm, 2.2-5.0 mm, 2.4-5.0 mm, 2.6-5.0 mm, 2.8-5.0 mm, 3.0-5.0 mm, 3.2-5.0 mm, 3.4-5.0 mm, 3.6-5.0 mm, 3.8-5.0 mm, 4.0-5.0 mm, 2.0-4.5 mm, 2.0-4.4 mm, 2.0-4.2 mm, 2.0-4.0 mm, 2.0-3.8 mm, 2.0-3.6 mm, 2.0-3.4 mm, 2.0-3.2 mm, or 2.0-3.0 mm; and the short side can be 1.5-5.0 mm, 1.8-4.6 mm, 2.4-4.6 mm, 2.6-4.6 mm, 2.8-4.6 mm, 3.0-4.6 mm, 3.2-4.6 mm, 3.4-4.6 mm, 3.6-4.6 mm, 3.8-4.6 mm, 4.0-4.6 mm, 1.6-4.5 mm, 1.6-4.4 mm, 1.6-4.2 mm, 1.6-4.0 mm, 1.6-3.8 mm, 1.6-3.6 mm, 1.6-3.4 mm, 1.6-3.2 mm, or 1.6-3.0 mm.

The EVOH resin composition is beneficial to more efficiently prepare the EVOH film formed therefrom. Suitable methods and equipment for preparing the EVOH film may include methods and equipment easily understood by those skilled in the art. The inventor believes that by controlling the surface roughness of the EVOH resin composition, the EVOH resin composition can reduce the torque in the extruder, and can also improve the appearance of the film or multilayer structure formed from the EVOH resin composition.

In yet another aspect, the present invention provides a multilayer structure having at least one layer formed from the EVOH resin composition of the present invention; at least one polymer layer; and at least one adhesive layer. The polymer layer can be selected from a low-density polyethylene layer, a polyethylene grafted maleic anhydride layer, a polypropylene layer, a nylon layer, and combinations thereof. The adhesive layer may be a tie layer, such as ARKEMA OREVAC 18729 from ARKEMA.

EXAMPLE

The following non-limiting examples of various aspects of the present invention are provided mainly to illustrate the various aspects of the invention and the benefits derived therefrom.

Example 1

A non-limiting preparation method of EVOH pellets formed from the EVOH resin composition is provided as follows. 10 non-limiting example EVOH resin compositions (Example EVOH 1-10) and 7 comparative example EVOH resin compositions (Comparative Example EVOH 1-7) were prepared according to a method similar to the method disclosed below. However, the specific methods for preparing Example EVOH 1-10 and Comparative Example EVOH 1-7 are generally different from the methods disclosed below in one or more aspects.

In the present invention, the slip agent is uniformly attached to the surface of the pellets by controlling different slip agent solution addition methods, and at the same time, we further control whether the slip agent solution is filled with nitrogen and the mass ratio of the slip agent solution to the pellets to achieve the ideal slip agent adhesion amount and uniformity.

Example EVOH 1 Pellets

Ethylene-vinyl acetate copolymer (EVAC) with an ethylene content of 32 mole % was saponified with a saponification degree of 99.5% to prepare an EVOH polymer. Subsequently, the EVOH was dissolved in a solution containing methanol and water (70:30). After that, the EVOH solid content of the solution was 41 wt. %, and the solution was placed at 60° C.

The EVOH/methanol/water solution was pumped into a feed pipe using a pump at a flow rate of 120 L/min, and then sent to an input pipe with a diameter of 2.8 mm. Then the solution was squeezed into water at 1.5° C. to form strands, and allowed to stay in water for 100 seconds to solidify. The strand pelletizing was performed, i.e., the coagulum was cut into EVOH pellets with a rotary knife at 1500 rpm. The EVOH pellets were centrifuged to separate into EVOH particles. The separated EVOH particles were washed with water. The EVOH pellets were cylindrical pellets with a height of about 3 mm and a cross-sectional long axis of about 2.4 mm.

Then the slip agent ethylene bis-stearyl amide (EBS) was added to the EVOH pellets. The addition amount of the slip agent was adjusted according to the condition that the final product contains 50 ppm of the slip agent, and the slip agent was added in a way that the slip agent was evenly dispersed in the solution. That is, the pellets immersed in the boric acid/sodium acetate solution were first added with a specific amount of slip agent according to the weight of the solution to uniformly disperse the slip agent, and then the pellets were immersed in the solution. The ratio of the solution to the pellets was 1:1 by weight. Next, the pellets and the solution were mixed at 80° C. for 24 hours, and nitrogen was blown in at a flow rate of 10 L/min to make them uniformly mixed, while the solvent was evaporated to dryness. Finally, the finished product was dried to obtain EVOH pellets with slip agent.

Example EVOH 2 Pellets

The EVOH pellets used in Example EVOH 2 were prepared using a process similar to that of Example EVOH 1 pellets. However, when preparing the EVOH pellets of Example EVOH 2, the EVOH pellets were cylindrical pellets with a height of about 2.0 mm and a cross-sectional long axis of about 4.5 mm and the EVOH pellets were added with a slip agent, the amount of which was adjusted according to the condition that the final product contained 60 ppm of slip agent, and the slip agent was added in a way that the slip agent was evenly dispersed in the solution.

That is, the pellets immersed in the boric acid/sodium acetate solution were first added with a specific amount of slip agent according to the weight of the solution to uniformly disperse the slip agent, and then the pellets were immersed in the solution. The ratio of the solution to the pellets was 0.8:1 by weight. Next, the pellets and the solution were mixed at 80° C. for 24 hours, and nitrogen was blown in at a flow rate of 10 L/min to make them uniformly mixed, while the solvent was evaporated to dryness. Finally, the finished product was dried to obtain EVOH pellets with slip agent.

Example EVOH 3 Pellets

The EVOH pellets used in Example EVOH 3 were prepared using a process similar to that of Example EVOH 1 pellets. However, when preparing the EVOH pellets of Example EVOH 3, the EVOH pellets were added with slip agent. The amount of slip agent added was adjusted according to the condition that the final product contained 90 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 1:1. Finally, the pellets were dried to obtain EVOH pellets with slip agent.

Example EVOH 4 Pellets

The EVOH pellets used in Example EVOH 4 were prepared using a process similar to that of Example EVOH 1 pellets. However, when preparing the EVOH pellets of Example EVOH 4, the EVOH pellets were added with slip agent. The amount of slip agent added was adjusted according to the condition that the final product contained 150 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 1:1. Finally, the pellets were dried to obtain EVOH pellets with slip agent.

Example EVOH 5 Pellets

The EVOH pellets used in Example EVOH 5 were prepared using a process similar to that of Example EVOH 1 pellets. However, when preparing the EVOH pellets of Example EVOH 5, the EVOH pellets were added with slip agent. The amount of slip agent added was adjusted according to the condition that the final product contained 175 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.9:1. Finally, the pellets were dried to obtain EVOH pellets with slip agent.

Example EVOH 6 Pellets

The EVOH pellets used in Example EVOH 6 were prepared using a process similar to that of Example EVOH 1 pellets. However, The EVOH pellets were cylindrical pellets with a height of about 4.5 mm and a cross-sectional long axis of about 2.0 mm and the EVOH pellets of Example EVOH 6 were saponified using an ethylene-vinyl acetate copolymer with an ethylene content of 29 mole %.

In addition, when preparing the EVOH pellets of Example EVOH 6, the EVOH pellets were added with a slip agent, the amount of which was adjusted according to the condition that the final product contained 75 ppm of slip agent, and the slip agent was added in a way that the slip agent was evenly dispersed in the solution. That is, the pellets immersed in the boric acid/sodium acetate solution were first added with a specific amount of slip agent according to the weight of the solution to uniformly disperse the slip agent, and then the pellets were immersed in the solution. The ratio of the solution to the pellets was 0.9:1 by weight. Next, the pellets and the solution were mixed at 80° C. for 24 hours, and nitrogen was blown in at a flow rate of 10 L/min to make them uniformly mixed, while the solvent was evaporated to dryness. Finally, the finished product was dried to obtain EVOH pellets with slip agent.

Example EVOH 7 Pellets

The EVOH pellets used in Example EVOH 7 were prepared using a process similar to that of Example EVOH 6 pellets. However, when preparing the EVOH pellets of Example EVOH 7, the EVOH pellets were added with slip agent. The amount of slip agent added was adjusted according to the condition that the final product contained 90 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.9:1. Finally, the pellets were dried to obtain EVOH pellets with slip agent.

Example EVOH 8 Pellets

The EVOH pellets used in Example EVOH 8 were prepared using a process similar to that of Example EVOH 6 pellets. However, when preparing the EVOH pellets of Example EVOH 8, the EVOH pellets were added with slip agent. The amount of slip agent added was adjusted according to the condition that the final product contained 150 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.8:1. Finally, the pellets were dried to obtain EVOH pellets with slip agent.

Example EVOH 9 Pellets

The EVOH pellets used in Example EVOH 9 were prepared using a process similar to that of Example EVOH 6 pellets. However, when preparing the EVOH pellets of Example EVOH 9, the EVOH pellets were added with slip agent. The amount of slip agent added was adjusted according to the condition that the final product contained 175 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 1:1. Finally, the pellets were dried to obtain EVOH pellets with slip agent.

Example EVOH 10 Pellets

The EVOH pellets used in Example EVOH 10 were prepared using a process similar to that of Example EVOH 6 pellets. However, when preparing the EVOH pellets of Example EVOH 10, the EVOH pellets were added with slip agent. The amount of slip agent added was adjusted according to the condition that the final product contained 60 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.8:1. Finally, the pellets were dried to obtain EVOH pellets with slip agent.

Comparative Example EVOH 1 Pellets

The EVOH pellets used in Comparative Example EVOH 1 were prepared using a process similar to that of Example EVOH 1 pellets. However, when the EVOH pellets of Comparative Example EVOH 1 were prepared, no slip agent was added to the EVOH pellets.

Comparative Example EVOH 2 Pellets

The EVOH pellets used in Comparative Example EVOH 2 were prepared using a process similar to that of Example EVOH 1 pellets. However, when preparing the EVOH pellets of Comparative Example EVOH 2, the EVOH pellets were added with slip agent. The amount of slip agent added was adjusted according to the condition that the final product contained 30 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.8:1. Finally, the pellets were dried to obtain EVOH pellets with slip agent.

Comparative Example EVOH 3 Pellets

The EVOH pellets used in Comparative Example EVOH 3 were prepared using a process similar to that of Example EVOH 1 pellets. However, when preparing the EVOH pellets of Comparative Example EVOH 3, the EVOH pellets were added with slip agent. The amount of slip agent added was adjusted according to the condition that the final product contained 250 ppm of slip agent, and the slip agent was added in a way that the slip agent was evenly dispersed in the solution.

That is, the pellets immersed in the boric acid/sodium acetate solution were first added with a specific amount of slip agent according to the weight of the solution to uniformly disperse the slip agent, and then the pellets were immersed in the solution. The ratio of the solution to the pellets was 0.8:1 by weight. Next, the pellets and the solution were uniformly mixed at 80° C. for 24 hours, while the solvent was evaporated to dryness. Finally, the finished product was dried to obtain EVOH pellets with slip agent.

Comparative Example EVOH 4 Pellets

The EVOH pellets used in Comparative Example EVOH 4 were prepared using a process similar to that of Example EVOH 1 pellets. However, when preparing the EVOH pellets of Comparative Example EVOH 4, the EVOH pellets were added with slip agent. The amount of slip agent added was adjusted according to the condition that the final product contained 90 ppm of slip agent, and the slip agent was added in the EVOH solution.

That is, an ethylene-vinyl acetate copolymer with an ethylene content of 32 mole % was saponified to a degree of saponification of 99.5% to prepare an EVOH polymer. Subsequently, EVOH was dissolved in a solution containing methanol and water (70:30), and a specific amount of slip agent was added according to the weight of the solution. After that, the EVOH solid content of the solution was 41 wt. %, and the solution was placed at 60° C.

Then the solution of methanol, water and EVOH was pelletized through underwater pelletizing. Specifically, the solution of methanol, water and EVOH was pumped into the feed pipe using a pump at a flow rate of 120 L/min, and then fed into the input pipe with a diameter of 2.8 mm, and then cut with a rotary knife at 1500 rpm. Add 5° C. water to cool EVOH pellets. Subsequently, the EVOH pellets were centrifuged to separate EVOH particles. The separated EVOH particles were washed with water, and then dried to obtain EVOH pellets with slip agent.

Comparative Example EVOH 5 Pellets

The EVOH pellets used in Comparative Example EVOH 5 were prepared using a process similar to that of Example EVOH 1 pellets. However, when preparing the EVOH pellets of Comparative Example EVOH 5, the EVOH pellets were added with slip agent. The amount of slip agent added was adjusted according to the condition that the final product contained 250 ppm of slip agent, and the slip agent was added by spraying before drying.

That is, the pellets were soaked in boric acid/sodium acetate and then taken out, and sprayed with a solution of a specific amount of slip agent dispersed in 1000 mL of water at room temperature. The mass ratio of the solution to the pellets was 0.9:1.

Finally, the pellets were dried to obtain EVOH pellets with slip agent.

Comparative Example EVOH 6 Pellets

The EVOH pellets used in Comparative Example EVOH 6 were prepared using a process similar to that of Example EVOH 1 pellets. However, when preparing the EVOH pellets of Comparative Example EVOH 6, the EVOH pellets were added with slip agent. The amount of slip agent added was adjusted according to the condition that the final product contained 60 ppm of slip agent, and the slip agent was added by drying the pellets and then dry blending. That is, the dried EVOH pellets were dry blended with the slip agent using a dry blender.

Comparative Example EVOH 7 Pellets

The EVOH pellets used in Comparative Example EVOH 7 were prepared using a process similar to that of Example EVOH 1 pellets. However, when preparing the EVOH pellets of Comparative Example EVOH 7, the EVOH pellets were added with slip agent. The amount of slip agent added was adjusted according to the condition that the final product contained 75 ppm of slip agent, and the slip agent was added in a way that the slip agent was evenly dispersed in the solution.

That is, the pellets immersed in the boric acid/sodium acetate solution were first added with a specific amount of slip agent according to the weight of the solution to uniformly disperse the slip agent, and then the pellets were immersed in the solution. The ratio of the solution to the pellets was 0.9:1 by weight. Next, the pellets and the solution were uniformly mixed at 80° C. for 24 hours without nitrogen gas, and the solvent was evaporated to dryness at the same time. Finally, the finished product was dried to obtain EVOH pellets with slip agent.

Example 2

The Example EVOH pellets 1-10 were used to form films respectively according to the following method. Example EVOH pellets 1-10 and Comparative Example EVOH pellets 1-7 were fed into a single layer T-die cast film extruder (Optical Control System MEV4) to prepare films. The thicknesses of the films formed from Example EVOH pellets 1-10 and Comparative Example EVOH pellets 1-7 were each 20 μm. The temperature of the extruder was set to 220° C., and the temperature of the die (i.e., T-die) was set to 230° C. The rotation frequency of the screw was 7 rpm (rotations/minutes).

Example 3

Example EVOH pellets 1-10 and Comparative Example EVOH pellets 1-7 were evaluated to judge the properties of these EVOH pellets and the films formed therefrom. As described above, Example EVOH pellets 1-10 were prepared according to a method similar to that described in Example 1. However, the methods of preparing EVOH pellets 1-10 differ in terms of the prepared EVOH pellets in the following aspects: ethylene content, slip agent addition method, slip agent addition amount, whether to fill with nitrogen, the mixing ratio of solution and pellets, operating temperature, and operating time. Comparative Example EVOH pellets 1-7 were also prepared according to a method similar to that described in Example 1.

The average torque value of the extruder was further evaluated. Following a method similar to that described in Example 2, films were formed separately from Example EVOH 1-10 and Comparative Example EVOH 1-7, and the film thickness uniformity was evaluated.

Table 1 below provides a summary of some attributes of Example EVOH pellets 1-10 and Comparative Example EVOH pellets 1-7, i.e., the amount of slip agent added, bulk density, angle of repose, weight of 100 pellets, Sk, overall standard deviation of Sk, and average torque value of the extruder, as well as the film thickness uniformity of the films formed from Example EVOH 1-10 and Comparative Example EVOH 1-7.

The surface roughness characteristics of the EVOH resin composition can also be described by the maximum line height (Rz). The definition standard of Rz refers to JIS B 0601-2001. The Rz is the sum of the height of the highest crest and the depth of the deepest trough in the profile curve on the reference length.

TABLE 1

| | ethylene content 32 mole % | | | | | ethylene content 29 mole % | | | | |
|---|---|---|---|---|---|---|---|---|---|---|
| | Example EVOH 1 | Example EVOH 2 | Example EVOH 3 | Example EVOH 4 | Example EVOH 5 | Example EVOH 6 | Example EVOH 7 | Example EVOH 8 | Example EVOH 9 | Example EVOH 10 |
| maximum line height roughness (Rz, μm) | 1.64 | 1.37 | 1.21 | 2.10 | 1.12 | 2.48 | 2.01 | 1.27 | 1.81 | 1.99 |
| slip agent content (ppm) | 50 | 60 | 90 | 150 | 175 | 75 | 90 | 150 | 175 | 60 |
| bulk density (g/cm$^3$) | 75.6 | 75.5 | 75.3 | 74.0 | 73.8 | 74.9 | 74.5 | 74.2 | 73.6 | 74.4 |
| angle of repose | 14.5° | 12.3° | 12.9° | 15.9° | 15.4° | 16.0° | 14.9° | 14.7° | 20.8° | 17.7° |
| weight of 100 pellets (g) | 1.72 | 1.72 | 1.68 | 1.65 | 1.70 | 1.82 | 1.79 | 1.83 | 1.81 | 1.77 |
| Sk (μm) | 0.7 | 0.84 | 1.10 | 1.55 | 1.83 | 0.82 | 1.08 | 0.92 | 0.88 | 1.10 |
| overall standard deviation of Sk | 0.52 | 0.44 | 0.36 | 0.15 | 0.10 | 0.38 | 0.33 | 0.15 | 0.12 | 0.37 |
| moisture content (%) | 0.68 | 0.22 | 1.02 | 0.05 | 0.01 | 0.38 | 0.72 | 0.19 | 0.55 | 0.85 |
| torque value (Torque) | 22 | 23 | 21 | 21 | 21 | 22 | 20 | 19 | 19 | 21 |
| film thickness uniformity | O | O | O | O | O | O | O | O | O | O |

| | ethylene content 32 mol % | | | | | | |
|---|---|---|---|---|---|---|---|
| | Comparative Example EVOH 1 | Comparative Example EVOH 2 | Comparative Example EVOH 3 | Comparative Example EVOH 4 | Comparative Example EVOH 5 | Comparative Example EVOH 6 | Comparative Example EVOH 7 |
| maximum line height roughness (Rz, μm) | 0.91 | 1.96 | 0.70 | 1.37 | 0.86 | 1.22 | 1.77 |
| slip agent content (ppm) | 0 | 30 | 250 | 90 | 250 | 60 | 75 |
| bulk density (g/cm$^3$) | 70.4 | 75.1 | 72.4 | 71.3 | 75.1 | 75.3 | 74.8 |
| angle of repose | 18.4° | 12.8° | 15.9° | 21° | 12.7° | 12.6° | 17.5° |

TABLE 1-continued

| | | | | | | | |
|---|---|---|---|---|---|---|---|
| weight of 100 pellets (g) | 1.59 | 1.62 | 1.66 | 1.68 | 1.61 | 1.65 | 1.78 |
| Sk (μm) | 0.59 | 2.31 | 0.49 | 0.55 | 2.24 | 1.44 | 1.10 |
| overall standard deviation of Sk | 0.46 | 1.13 | 0.16 | 0.47 | 0.08 | 0.86 | 0.82 |
| torque value (Torque) | 140 | 26 | 19 | 120 | 21 | 22 | 24 |
| film thickness uniformity | Δ | Δ | X | Δ | X | Δ | Δ |

In order to evaluate the surface roughness (Sk) of Example EVOH 1-10 pellets and Comparative Example EVOH 1-7 pellets, the EVOH pellets were placed flat on the board, and the surface roughness of the pellets was measured. When measuring, it was necessary to exclude the data when the inclination was greater than 0.5 to ensure that the scanning plane is relatively horizontal. Inclination=Maximum surface height Sz/Side length of the analysis range (i.e., 129 μm). The laser microscope was LEXT OLS5000-SAF manufactured by Olympus, and the image was made at an air temperature of 24±3° C. and a relative humidity of 63±3%. The filter was set to no filter. The light source was a light source with a wavelength of 405 nm. The objective lens was a 100× magnifying glass (MPLAPON-100×LEXT). The optical zoom was set to 1.0×. The image area was set to 129 μm×129 μm (When measuring Rz, the center line of the image area was taken). The resolution was set to 1024 pixels×1024 pixels. The value of 100 pellets was measured and the average and standard deviation were taken. Among them, Sk was measured by the method of ISO 25178:2012, and Rz was measured by the method of JIS B 0601-2001.

When evaluating the angle of repose of Example EVOH 1-10 and Comparative Example EVOH 1-7, a blank A4 paper was laid on the test table, the glass funnel was filled with EVOH resin to a fixed height, and the glass funnel was slowly lifted at a rate of 2 cm/s, and then the angle between the side of the particle group and the desktop was measured with a protractor.

The bulk density of Example EVOH 1-10 and Comparative Example EVOH 1-7 was analyzed and evaluated using the method of JIS K-7365.

The torque value of the extruder in the processing of Example EVOH 1-10 and Comparative Example EVOH 1-7 was based on the data of the screw extruder of OCS. The model of the OCS screw was ME25. The sample was poured into the machine for cleaning at 50 rpm for 5 minutes, and then the sample was formally measured: When the film was formed at 7 rpm and the temperature of the screw was Zone1 195° C., Zone2 215° C., Zone3 220° C., Zone4 230° C., Zone5 230° C., the torque value per minute from 15 to 20 minutes was measured and the average value was taken.

In addition, the film appearance of the films formed from Example EVOH 1-10 and Comparative Example EVOH 1-7 was evaluated. During the evaluation, the state of the normal extruded film was controlled to an average thickness of 25 μm. Under the condition of uneven film thickness, a 10*10 cm film surface was selected and 9 locations were evenly marked for evaluation; if the thickness of more than 5 points was greater than the theoretical value ±10 the film thickness was uneven. If the film thickness was normal, it was indicated by "O"; if the film thickness was uneven, it was indicated by "Δ"; if the film was broken, it was indicated by "X".

The amount of slip agent added for Example EVOH 1-10 and Comparative Example EVOH 1-7 was determined by the following method based on the amount of slip agent attached to the surface of the pellets: 20 g of dioctyl phthalate (DOP) was put in a 50 mL beaker, and then 10 g of EVOH pellets were added and stirred thoroughly. After that, it was heated and stirred on a thermal stirrer heated to 100° C. for more than 60 minutes to elute the slip agent on the surface of the pellets into DOP. 20-30 mg of the DOP solution in which the slip agent was dissolved was transferred to a trace nitrogen analyzer (TN-2100H, manufactured by Mitsubishi Chemical Corporation), and subjected to a quantitative analysis of nitrogen concentration.

The results show that Example EVOH 1-10 have a low torque output value (19-25 Torque), and the films formed from Example EVOH 1-10 do not have film cracks or uneven film thickness, showing that Example EVOH 1-10 exhibit better processing torque output and film appearance characteristics.

The test results of the present invention show that as long as the surface roughness parameter Sk of the EVOH resin composition and its standard deviation are controlled within a specific range, the torque value of the EVOH pellets at the screw output during processing can be reduced, or the stability during output can be improved to obtain a better film appearance. As shown in Table 1, Comparative Example EVOH 1-5 have a Sk that exceeds the expected range described herein, and Comparative Example EVOH 2, 6, and 7 have an overall standard deviation of Sk that exceeds the expected range described herein. The test result is that Comparative Example EVOH 1 and 4 have higher output torque values (140 and 120 Torque), the films formed from Comparative Example EVOH 1, 2, 4, 6 and 7 have uneven film thickness, and the films formed from Comparative Example EVOH 3 and 5 are broken. Therefore, the films formed from Comparative Example EVOH 1-7 all have poor film appearance.

In summary, the EVOH resin composition of the present invention has a specific range of surface roughness parameter Sk and the overall standard deviation of Sk, so it can reduce the torque value of EVOH pellets at the output of the screw during processing, so as to achieve the effect of energy saving, realize a cost-effective EVOH resin composition manufacturing process, and improve the stability during output to obtain a better film appearance. The inventor found that the surface roughness Sk of the EVOH resin composition can be controlled by controlling different slip agent addition methods and addition amounts in the EVOH process, so that the EVOH resin composition and the film formed therefrom have good effects.

As used herein, all ranges provided are meant to include every specific range within, and combination of sub ranges between, the given ranges. Additionally, all ranges provided herein are inclusive of the end points of such ranges, unless stated otherwise. Thus, a range from 1 to 5 includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application is specifically and individually indicated to be incorporated by reference. In the event of an inconsistency between the present disclosure and any publication or patent application incorporated herein by reference, the present disclosure controls.

As used herein, the terms "comprising," "having," and "including" are used in their open and non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within ±5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. An ethylene-vinyl alcohol copolymer resin composition, in the form of pellet, comprising an ethylene-vinyl alcohol copolymer resin and a slip agent, wherein the ethylene-vinyl alcohol copolymer resin composition has a surface with a core height difference (Sk) ranging from 0.6 to 2.0 and the overall standard deviation of Sk ranges from 0.05 to 0.55.

2. The ethylene-vinyl alcohol copolymer resin composition of claim 1, wherein the overall standard deviation of Sk ranges from 0.10 to 0.45.

3. The ethylene-vinyl alcohol copolymer resin composition of claim 1, wherein the ethylene-vinyl alcohol copolymer resin has an ethylene content of 20 to 48 mole %.

4. The ethylene-vinyl alcohol copolymer resin composition of claim 1, wherein the ethylene-vinyl alcohol copolymer resin has a saponification degree greater than 99.5 mole %.

5. The ethylene-vinyl alcohol copolymer resin composition of claim 1, wherein the slip agent is in an amount ranging from 50 to 200 ppm.

6. The ethylene-vinyl alcohol copolymer resin composition of claim 1 having an bulk density of between 73 and 76 g/cm$^3$.

7. The ethylene-vinyl alcohol copolymer resin composition of claim 1, wherein a weight of 100 pellets of the ethylene-vinyl alcohol copolymer resin composition is between 1.4 and 2.3 g.

8. The ethylene-vinyl alcohol copolymer resin composition of claim 1 having an angle of repose ranging from 12.0° to 21.0°.

9. The ethylene-vinyl alcohol copolymer resin composition of claim 1 having a boron content between 10 and 450 ppm.

10. The ethylene-vinyl alcohol copolymer resin composition of claim 1 having a surface with a maximum line height roughness (Rz) of 1.0-9.9 μm.

11. The ethylene-vinyl alcohol copolymer resin composition of claim 1 having a moisture content less than 1.1 wt %.

12. An ethylene-vinyl alcohol copolymer film formed from the ethylene-vinyl alcohol copolymer resin composition of claim 1.

13. A multilayer structure, comprising:
(a) at least one layer formed from the ethylene-vinyl alcohol copolymer resin composition of claim 1;
(b) at least one polymer layer; and
(c) at least one adhesive layer.

14. The multilayer structure of claim 13, wherein the polymer layer is selected from a group consisting of low density polyethylene layer, polyethylene grafted maleic anhydride layer, polypropylene layer and nylon layer, and the adhesive layer is a tie layer.

* * * * *